United States Patent
Huang et al.

(10) Patent No.: US 10,963,018 B2
(45) Date of Patent: Mar. 30, 2021

(54) SHAFT STRUCTURE AND ELECTRONIC DEVICE USING THE SAME

(71) Applicant: Acer Incorporated, New Taipei (TW)

(72) Inventors: Yu-Chin Huang, New Taipei (TW); Wen-Neng Liao, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 16/583,341

(22) Filed: Sep. 26, 2019

(65) Prior Publication Data

US 2020/0183461 A1 Jun. 11, 2020

(30) Foreign Application Priority Data

Dec. 5, 2018 (TW) .................................. 107143756

(51) Int. Cl.
*G06F 1/16* (2006.01)
*F16D 13/70* (2006.01)

(52) U.S. Cl.
CPC ........... *G06F 1/1679* (2013.01); *F16D 13/70* (2013.01); *G06F 1/1616* (2013.01); *G06F 1/1681* (2013.01); *E05Y 2900/606* (2013.01)

(58) Field of Classification Search
CPC ......................... G06F 1/1681; E05Y 2900/606
USPC .................. 16/297, 303, 319, 320, 334, 341
See application file for complete search history.

(56) References Cited

U.S. PATENT DOCUMENTS

| | | | |
|---|---|---|---|
| 5,474,403 A | 12/1995 | Hetrich | |
| 5,715,576 A * | 2/1998 | Liu | G06F 1/1616 16/303 |
| 6,438,228 B1 * | 8/2002 | Jeong | H04M 1/0216 16/341 |
| 6,745,436 B2 * | 6/2004 | Kim | H04M 1/0216 16/303 |
| 8,024,841 B2 * | 9/2011 | Shen | G06F 1/1681 16/341 |

(Continued)

FOREIGN PATENT DOCUMENTS

| CN | 2786550 Y | 6/2006 |
|---|---|---|
| CN | 201034112 Y | 3/2008 |

(Continued)

OTHER PUBLICATIONS

TIPO Office Action dated Oct. 21, 2019, Taiwan Application No. 107143756, pp. 1-5.

(Continued)

*Primary Examiner* — Adrian S Wilson
(74) *Attorney, Agent, or Firm* — McClure, Qualey & Rodack, LLP

(57) ABSTRACT

A shaft structure and an electronic device using the same are provided. The shaft structure includes a friction fixing member, a friction rotating member, a latch and a magnetic module. The friction fixture has a fixed wall. The friction rotating member has an elastic wall. The friction rotating member is inserted into the friction fixing member. The latch is inserted into the friction rotating member and pushed against the inner side of the elastic wall so that the elastic wall is expanded to push against the fixed wall of the friction fixing member. The magnetic module is configured to provide a magnetic repulsive force to the latch to push the latch against the elastic wall.

16 Claims, 6 Drawing Sheets

(56) References Cited

U.S. PATENT DOCUMENTS

| | | | | |
|---|---|---|---|---|
| 2002/0112319 | A1* | 8/2002 | Kida | G06F 1/1681 16/342 |
| 2006/0002068 | A1* | 1/2006 | Kim | G06F 1/1679 361/679.27 |
| 2012/0165082 | A1* | 6/2012 | Kim | H04M 1/0216 455/575.3 |
| 2013/0229763 | A1* | 9/2013 | Guo | G06F 1/1637 361/679.27 |
| 2014/0376180 | A1* | 12/2014 | Chen | G06F 1/1681 361/679.55 |
| 2016/0357225 | A1* | 12/2016 | Huang | E05D 3/18 |
| 2017/0308130 | A1* | 10/2017 | Hsu | G06F 1/1643 |
| 2018/0196479 | A1 | 7/2018 | Li et al. | |
| 2018/0284847 | A1* | 10/2018 | Huang | F16C 11/04 |
| 2020/0218315 | A1* | 7/2020 | Huang | G06F 1/1616 |

FOREIGN PATENT DOCUMENTS

| | | |
|---|---|---|
| CN | 201041189 Y | 3/2008 |
| CN | 101298910 A | 11/2008 |
| CN | 201991888 U | 9/2011 |
| CN | 204284114 U | 4/2015 |
| CN | 204357975 U | 5/2015 |
| CN | 207095425 U | 3/2018 |
| CN | 207454457 U | 6/2018 |
| CN | 208056847 U | 11/2018 |
| DE | 10241737 A1 | 3/2004 |
| TW | M503292 U | 6/2015 |
| TW | I582567 B | 5/2017 |
| TW | I594685 B | 8/2017 |
| TW | 201826073 A | 7/2018 |
| TW | I647560 B | 1/2019 |

OTHER PUBLICATIONS

CN Office Action dated Nov. 24, 2020 in Chinese application (No. 201811495098.7).

\* cited by examiner

SHAFT STRUCTURE AND ELECTRONIC DEVICE USING THE SAME

This application claims the benefit of Taiwan application Serial No. 107143756, filed Dec. 5, 2018, the subject matter of which is incorporated herein by reference.

BACKGROUND OF THE INVENTION

Field of the Invention

The invention relates in general to a shaft structure and an electronic device using the same, and more particularly to a torque shaft and an electronic device using the same.

Description of the Related Art

New varieties of notebook computers and tablets are provided one after another. In the design of the rotational bracket or the open-and-close bracket, the notebook computer or the tablet needs a shaft structure through which the bracket can be rotated or opened and closed.

The durability of the shaft structure currently available in the market decays by about 15 to 30% after 15000 times of use. As the design of notebook computer is directed towards higher efficiency and longer durability, the conventional durability cannot meet the current needs.

Therefore, it has become a prominent task for the industries to provide a shaft structure which has better durability and can be manufactured using simpler method, lower manufacturing cost and fewer assembly time.

SUMMARY OF THE INVENTION

The invention is directed to a shaft structure and an electronic device using the same capable of maintaining the positioning performance of the shaft structure using magnetic technology so that the durability of the shaft structure can be greatly increased.

According to an embodiment of the present invention, a shaft structure is provided. The shaft structure includes a friction fixing member, a friction rotating member, a latch and a magnetic module. The friction fixing member has a fixed wall. The friction rotating member has an elastic wall. The friction rotating member is inserted into the friction fixing member. The latch is inserted into the friction rotating member and pushed against the inner side of the elastic wall, so that the elastic wall is expanded to push against the fixed wall of the friction fixing member. The magnetic module is configured to provide a magnetic repulsive force to the latch to push the latch against the elastic wall.

According to another embodiment of the present invention, an electronic device is provided. The electronic device includes a first component, a second component and a shaft structure. The shaft structure includes a friction fixing member, a friction rotating member, a latch and a magnetic module. The friction fixing member has a fixed wall. The first component synchronizes with the friction fixing member. The friction rotating member has an elastic wall. The friction rotating member is inserted into the friction fixing member. The second component synchronizes with the friction rotating member. The latch is inserted into the friction rotating member and pushed against the inner side of the elastic wall, so that the elastic wall is expanded to push against the fixed wall of the friction fixing member. The magnetic module is configured to provide a magnetic repulsive force to the latch to push the latch against the elastic wall.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
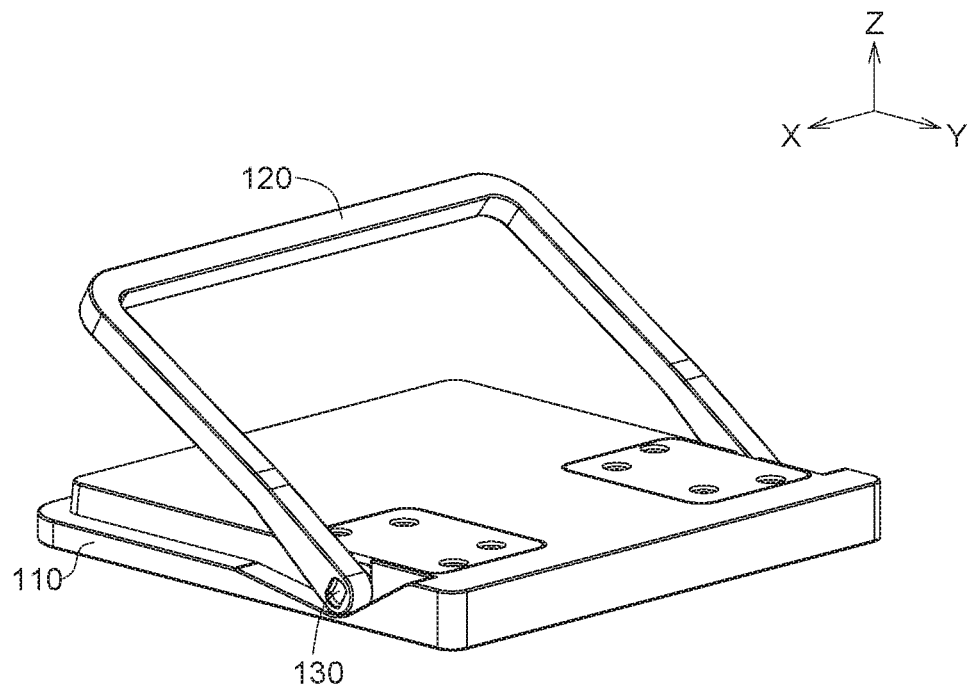
FIG. 1 is a schematic diagram of an electronic device according to an embodiment.

Referring to FIG. 1, a schematic diagram of an electronic device 100 according to an embodiment is shown. The electronic device 100 can be realized by such as a notebook computer, a tablet or a mobile phone. The electronic device 100 includes a first component 110, a second component 120 and a shaft structure 130. The first component 110 can be realized by such as a host base, a keyboard, a screen, or a bracket. The second component 120 can be realized by such as a host base, a keyboard, a screen, or a bracket. In an embodiment as indicated in FIG. 1, the first component 110 is a host base, and the second component 120 is a bracket, but the present invention is not limited thereto.

The first component 110 and the second component 120 rotate with respect to each other through the shaft structure 130, The shaft structure 130 is a torque shaft capable of positioning the shaft structure 130 at any angle through a frictional force. Thus, the relative angle between the first component 110 and the second component 120 can be fixed at an angle convenient to the user.

The frictional force may scrape the shaft structure 130. Using magnetic technology, the present embodiment can maintain the positioning performance of the shaft structure 130 to avoid the positioning performance of the shaft structure 130 being affected due to abrasion. The structural design and operational principles of the present embodiment are explained below.

Figure 2:
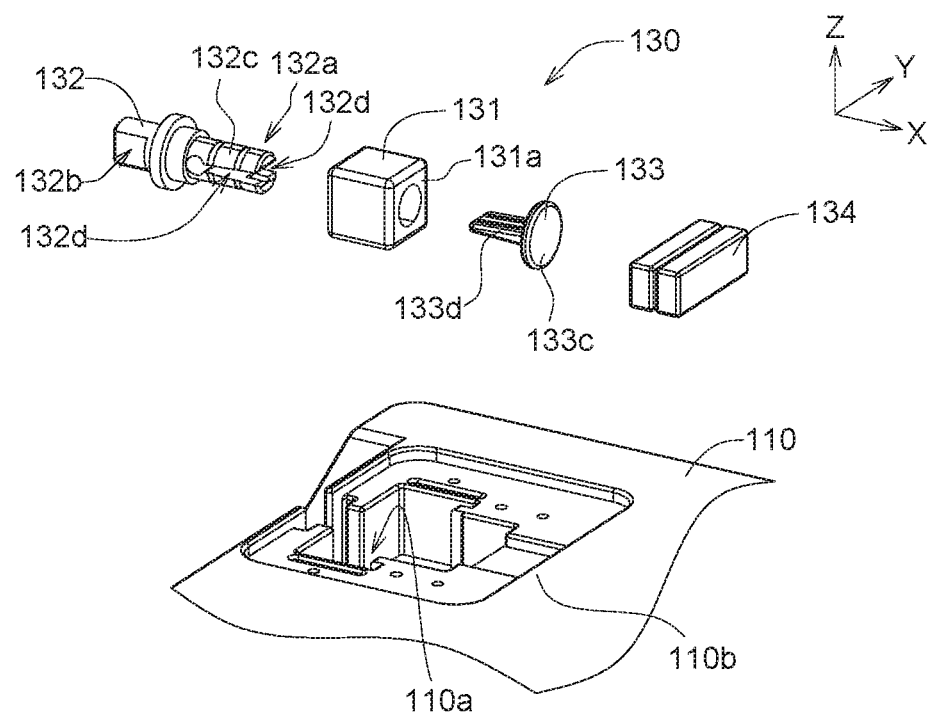
FIG. 2 is an explosion diagram of a shaft structure according to an embodiment.

Referring to FIG. 2, an explosion diagram of a shaft structure 130 according to an embodiment is shown. The shaft structure 130 includes a friction fixing member 131, a friction rotating member 132, a latch 133 and a magnetic module 134. The friction fixing member 131 synchronizes with the first component 110. For example, the first component 110 fixes the cubic friction fixing member 131 through a recess 110a, so that the friction fixing member 131 cannot rotate with respect to the first component 110. Therefore, the friction fixing member 131 and the first component 110 can be synchronized.

The friction rotating member 132 is inserted into the friction fixing member 131. The friction rotating member 132 has a cylinder end 132a which rotates with respect to the friction fixing member 131. The friction rotating member 132 has a flat end 132b which can be embedded into the second component 120, so that the friction rotating member 132 and the second component 120 can be synchronized.

Since the friction rotating member 132 can rotate with respect to the friction fixing member 131, the second component 120 can synchronize with the friction rotating member 132, and the first component 110 can synchronize with the friction fixing member 131. Therefore, the second component 120 can rotate with respect to the first component 110.

The friction fixing member 131 has a fixed wall 131a, and the friction rotating member 132 has an elastic wall 132c, wherein the elastic wall 132c has elasticity. As indicated in FIG. 2, the elastic wall 132c has two openings 132d. In another embodiment, the quantity of opening 132d can be one or more than three. The opening 132d enables the elastic wall 132c to be flexible and have elasticity. When the elastic wall 132c leans on the fixed wall 131a outwardly, the frictional force between the elastic wall 132c and the fixed wall 131a makes the friction rotating member 132 be positioned at a specific angle. Therefore, if the elastic wall 132c continuously leans on the fixed wall 131a, the positioning performance of the shaft structure 130 will be effectively maintained.

Figure 3:
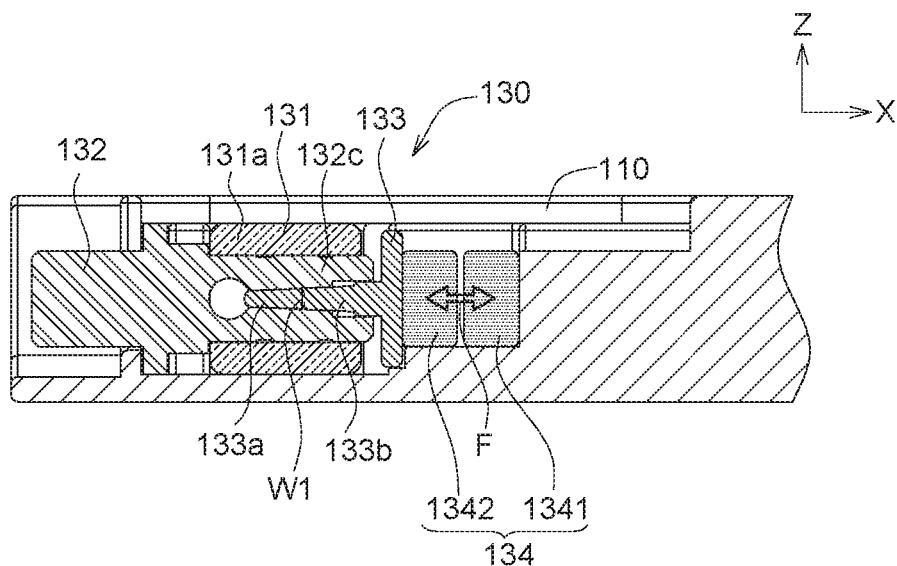
FIG. 3 is a top view of a shaft structure.

Referring to FIG. 3, a top view of a shaft structure 130 is shown. The latch 133 is inserted into the friction rotating member 132 and pushed against the inner side of the elastic wall 132c, so that the elastic wall 132c is expanded to push against the fixed wall 131a of the friction fixing member 131, The latch 133 has a width W1 which gradually increases from a top end 133a to a bottom end 133b. The deeper the latch 133 is inserted, the wider the elastic wall 132c will be expanded by the latch 133 and the larger the frictional force will be generated between the elastic all 132c and the fixed wall 131a.

The magnetic module 134 is configured to provide a magnetic repulsive force F to the latch 133 to push the latch 133 against the elastic wall 132c. The magnetic module 134 includes a first magnetic member 1341 and a second magnetic member 1342. The first magnetic member 1341 is disposed at a fixed end 110b (illustrated in FIG. 2). The fixed end 110b, which can be realized by such as a slot of the first component 110, can fix the first magnetic member 1341. The second magnetic member 1342 leans on the latch 133. The two opposite sides between the first magnetic member 1341 and the second magnetic member 1342 have the same magnetic pole. For example, the N pole of the first magnetic member 1341 is opposite to the N pole of the second magnetic member 1342. Or, the S pole of the first magnetic member 1341 is opposite to the S pole of the second magnetic member 1342. Thus, the magnetic repulsive force F generated by the magnetic module 134 can push the second magnetic member 1342 towards the latch 133 to push the latch 133 against the elastic wall 132c.

Figure 4:
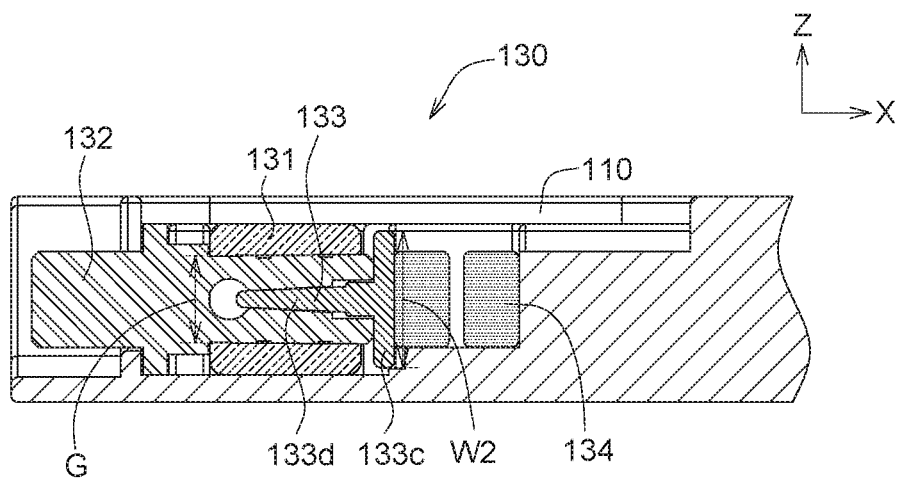
FIG. 4 is a schematic diagram of a scraped shaft structure.

Referring to FIG. 4, a schematic diagram of a scraped shaft structure 130 is shown. Over a period of use, the frictional force between the elastic wall 132c and the fixed wall 131a will scrape the elastic wall 132c or the fixed wall 131a, Regardless whether the elastic wall 132c or the fixed wall 131a is scraped, the latch 133 can be moved inwardly by the magnetic repulsive force F to push the elastic wall 132c against the fixed wall 131a tightly. Thus, over a long period of use, the positioning performance of the shaft structure 130 still can be maintained at a certain level.

As indicated in FIG. 4, the latch 133 includes a bottom portion 133c and an extending portion 133d. The extending portion 133d is connected to the bottom portion 133c. The bottom portion 133c has a width W2 larger than the gap G of the fixed wall 131a, so that the bottom portion 133c has an enough area to contact with the second magnetic member 1342.

As indicated in FIG. 2, the extending portion 133d of the latch 133 is a plate structure. In another embodiment, the extending portion 133d of the latch 133 can also be a conic structure.

Figure 5:
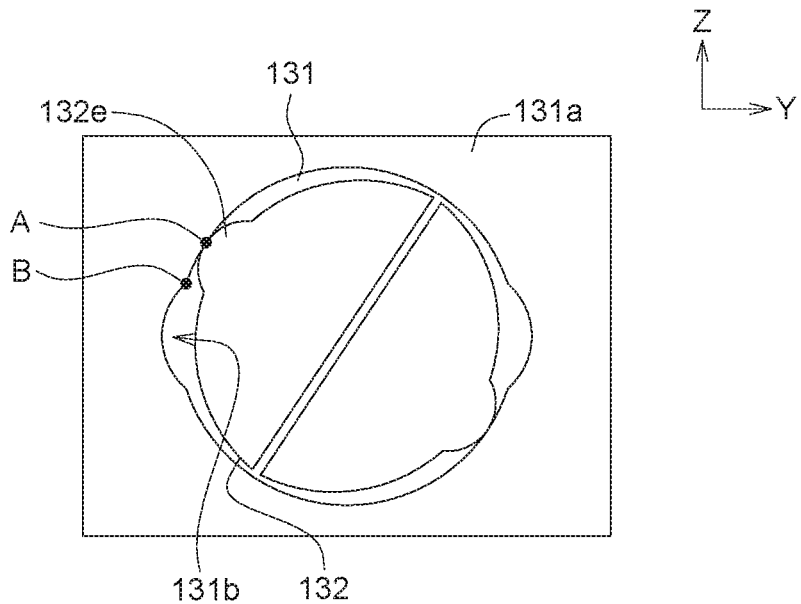
FIG. 5 is a cross-sectional view of a friction fixing member and a friction rotating member.

Referring to FIG. 5, a cross-sectional view of a friction fixing member 131 and a friction rotating member 132 is shown. The fixed wall 131a of the friction fixing member 131 has at least one positioning slot 131b, The elastic wall 132c of the friction rotating member 132 has at least one positioning bump 132e which slides into the positioning slot 131b to position the friction rotating member 132.

Figure 6:
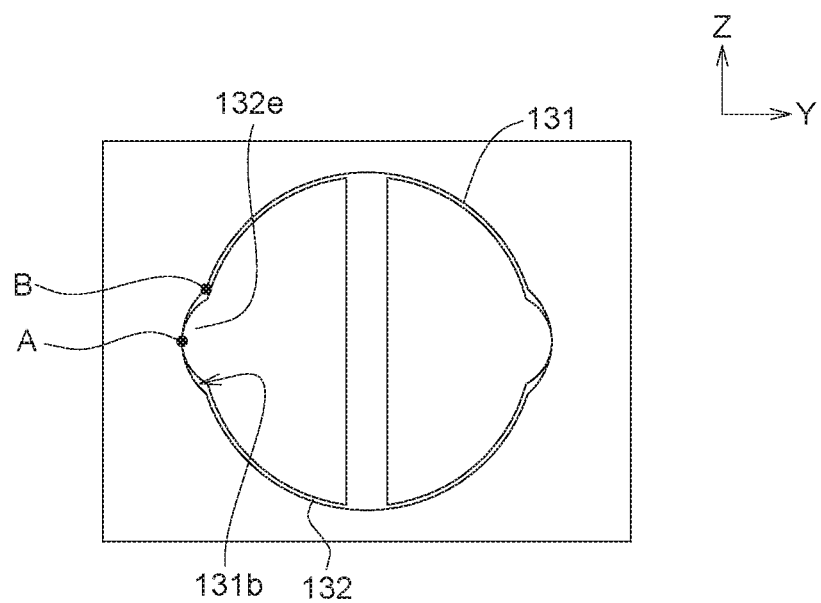
FIG. 6 is a schematic diagram of a positioning bump which slides into a positioning slot.

Refer to FIGS. 5 to 6. FIG. 6 is a schematic diagram of a positioning bump 132e which slides into a positioning slot 131b. In the present embodiment, the positioning slot 131b is larger than the positioning bump 132e, so that when the positioning bump 132e is located at an edge of the positioning slot 131b (for example, when the point A of the positioning bump 132e is located at the point B of the positioning slot 131b), the positioning bump 132e slides to the positioning slot 131b to home the friction rotating member 132 automatically.

Figure 7A:
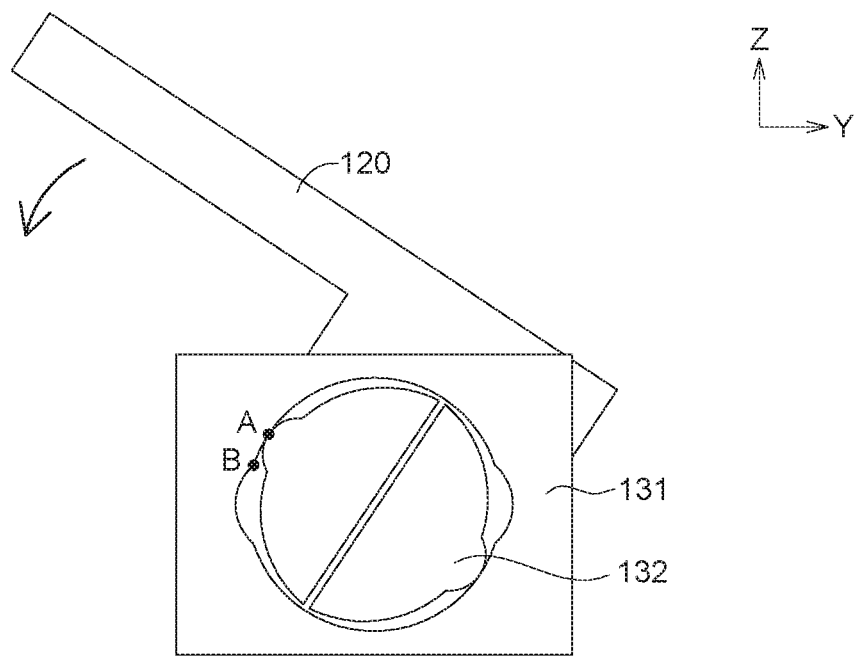
FIGS. 7A to 7D are schematic diagrams of a second component being automatically homed.
Figure 7B:
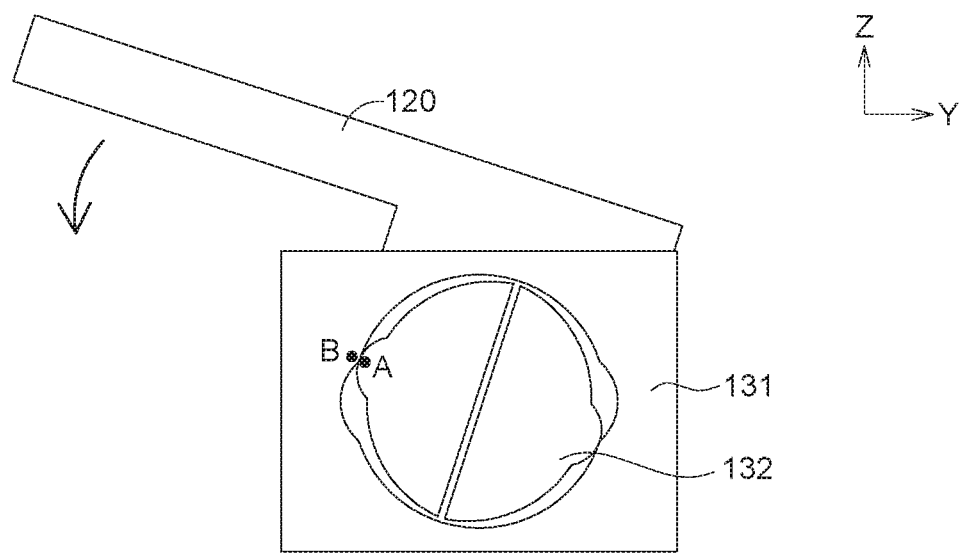
Figure 7C:
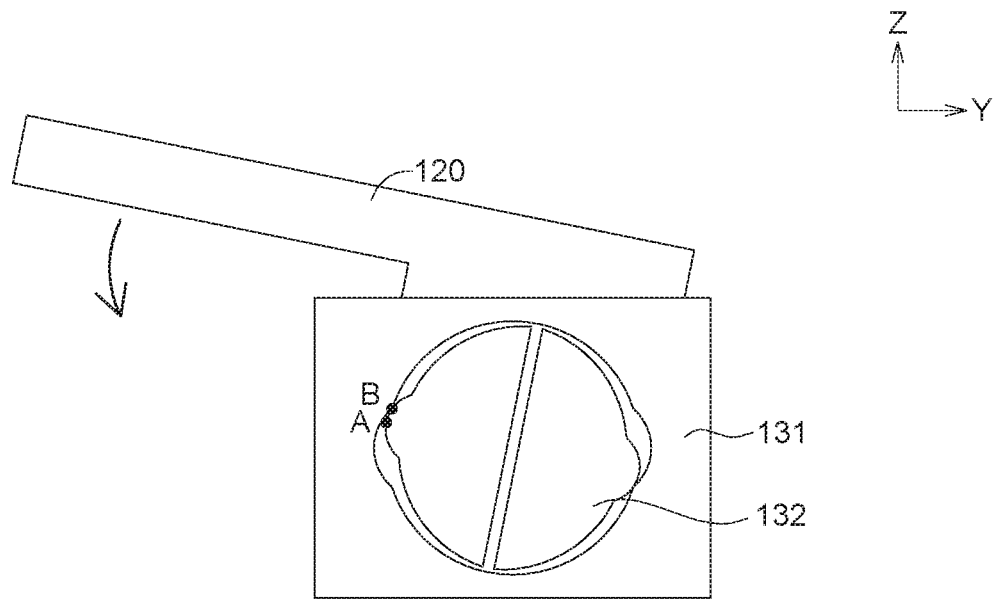
Figure 7D:
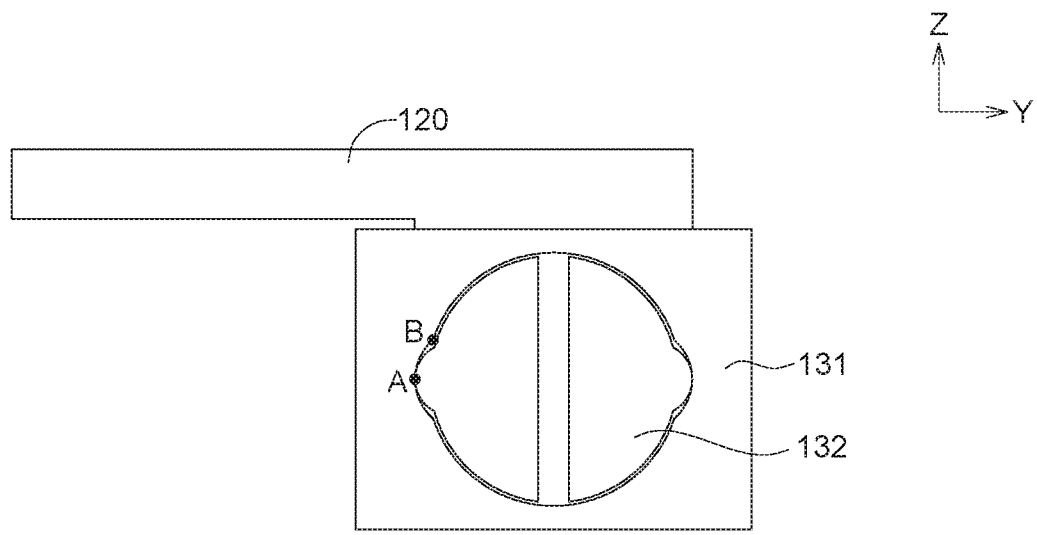

As indicated in FIGS. 7A to 7D, schematic diagrams of a second component 120 being automatically homed are shown. The second component 120 synchronizing with the friction rotating member 132 can be automatically homed through the above design. As indicated in FIG. 7A, before the point A passes through the point B, the user can apply a force to the second component 120, so that the second component 120 can be rotated to a specific angle. As indicated in FIG. 7B, when the point A is located at the point B, the second component 120 starts to be homed automatically. As indicated in FIGS. 7C to 7D, the user does not need to apply any force to the second component 120, and the second component 120 will be automatically rotated until the specific angle is reached.

Figure 8A:
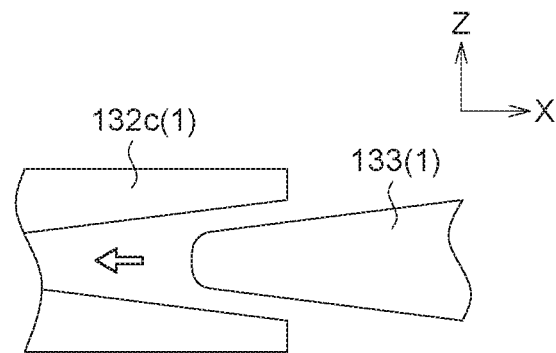
FIGS. 8A to 8C are schematic diagrams of other design aspects of an elastic wall and a latch.
Figure 8B:
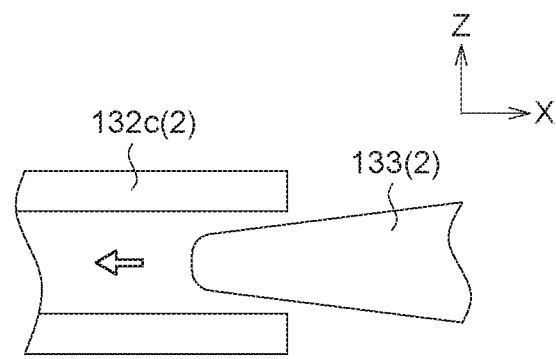
Figure 8C:
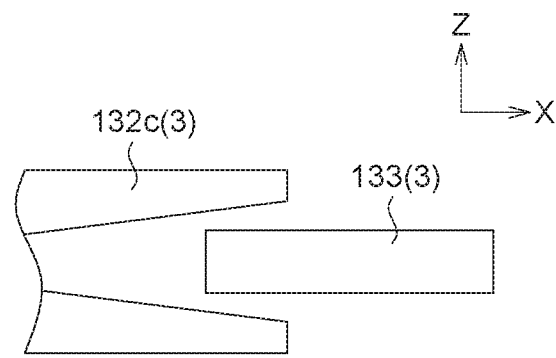

Referring to FIGS. 8A to 8C, schematic diagrams of other design aspects of an elastic wall 132c and a latch 133 are shown. As indicated in FIG. 8A, the elastic wall 132c(1) and the latch 133(1) have inclined planes, so that when the latch 133(1) is inserted into the friction rotating member, the elastic wall 132c(1) can be smoothly expanded. As indicated in FIG. 8B, the elastic wall 132c(2) has a flat plane and the latch 133(2) has an inclined plane, so that when the latch 133(2) is inserted into the friction rotating member, the elastic wall 132c(2) can be smoothly expanded. As indicated in FIG. 8C, the elastic wall 132c(3) has an inclined plane and the latch 133(3) has a flat plane, so that when the latch 133(3) is inserted into the friction rotating member, the elastic wall 132c(3) can be smoothly expanded.

As disclosed in above embodiments, the shaft structure 130, using magnetic technology, can maintain the positioning performance of the shaft structure 130, so that the durability of the shaft structure 130 can be increased greatly. Besides, through the design of the positioning bump 132e and the positioning slot 131b, automatic homing can be performed. The design adopted in above embodiments can be implemented at lower manufacturing cost, and this is indeed a big improvement to the industries.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A shaft structure, comprising:
    a friction fixing member having a fixed wall;
    a friction rotating member having an elastic wall, wherein the friction rotating member is inserted into the friction fixing member;
    a latch inserted into the friction rotating member and pushed against an inner side of the elastic wall, so that the elastic wall is expanded to push against the fixed wall of the friction fixing member; and
    a magnetic module configured to provide a magnetic repulsive force to the latch to push the latch against the elastic wall.

2. The shaft structure according to claim 1, wherein the elastic wall of the friction rotating member has two openings.

3. The shaft structure according to claim 1, wherein the latch has a width which gradually increases from a top end to a bottom end.

4. The shaft structure according to claim 1, wherein the magnetic module comprises:
    a first magnetic member disposed at a fixed end; and
    a second magnetic member configured to lean on the latch, wherein magnetic poles of two opposite sides of the first magnetic member and the second magnetic member are identical.

5. The shaft structure according to claim 1, wherein the latch comprises:
    a bottom portion whose width is larger than a gap of the fixed wall; and
    an extending portion connected to the bottom portion.

6. The shaft structure according to claim 5, wherein the extending portion is a plate structure or a conic structure.

7. The shaft structure according to claim 1, wherein the fixed wall of the friction fixing member has at least one positioning slot, and the elastic wall of the friction rotating member has at least one positioning bump which slides into the positioning slot to position the friction rotating member.

8. The shaft structure according to claim 7, wherein the positioning slot is larger than the positioning bump, so that when the positioning bump is located at an edge of the positioning slot, the positioning bump slides into the positioning slot to home the friction rotating member automatically.

9. An electronic device, comprising:
    a first component;
    a second component; and
    a shaft structure, comprising:
        a friction fixing member having a fixed small, wherein the first component synchronizes with the friction fixing member;
        a friction rotating member having an elastic wall, wherein the friction rotating member is inserted into the friction fixing member, and the second component synchronizes with the friction rotating member;
        a latch inserted into the friction rotating member and pushed against an inner side of the elastic wall, so that the elastic wall is expanded to push against the fixed wall of the friction fixing member; and
        a magnetic module configured to provide a magnetic repulsive force to the latch to push the latch against the elastic wall.

10. The electronic device according to claim 9, wherein the elastic wall of the friction rotating member has two openings.

11. The electronic device according to claim 9, wherein the latch has a width which gradually increases from a top end to a bottom end.

12. The electronic device according to claim 9, wherein the magnetic module comprises:
    a first magnetic member disposed at a fixed end; and
    a second magnetic member leaning on the latch, wherein magnetic poles of two opposite sides of the first magnetic member and the second magnetic member are identical.

13. The electronic device according to claim 9, wherein the latch comprises:
    a bottom portion whose width is larger than a gap of the fixed wall; and
    an extending portion connected to the bottom portion.

14. The electronic device according to claim 13, wherein the extending portion is a plate structure or a conic structure.

15. The electronic device according to claim 9, wherein the fixed wall of the friction fixing member has at least one positioning slot, and the elastic wall of the friction rotating member has at least one positioning bump which slides into the positioning slot to position the friction rotating member.

16. The electronic device according to claim 15, wherein the positioning slot is larger than the positioning bump, so that when the positioning bump is located at an edge of the positioning slot, the positioning bump slides into the positioning slot to home the friction rotating member automatically.

* * * * *